United States Patent
Touyama (10) Patent No.: US 9,821,268 B2
(45) Date of Patent: Nov. 21, 2017

(54) EXHAUST GAS TREATMENT DEVICE AND WASTE WATER TREATMENT METHOD FOR EXHAUST GAS TREATMENT DEVICE

(71) Applicant: FUJI ELECTRIC CO., LTD., Kawasaki-shi, Kanagawa (JP)

(72) Inventor: Hiroyuki Touyama, Kawasaki (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/252,141

(22) Filed: Aug. 30, 2016

(65) Prior Publication Data

US 2017/0001143 A1    Jan. 5, 2017

Related U.S. Application Data

(63) Continuation of application No. PCT/JP2015/071655, filed on Jul. 30, 2015.

(30) Foreign Application Priority Data

Sep. 2, 2014    (JP) .................................. 2014-177612

(51) Int. Cl.
*B01D 53/50*    (2006.01)
*B01D 53/77*    (2006.01)
(Continued)

(52) U.S. Cl.
CPC ......... *B01D 53/502* (2013.01); *B01D 53/346* (2013.01); *B01D 53/50* (2013.01);
(Continued)

(58) Field of Classification Search
CPC ...... B01D 53/50; B01D 53/346; B01D 53/92; B01D 2251/304; B01D 2251/402;
(Continued)

(56) References Cited

U.S. PATENT DOCUMENTS 5,484,535 A * 1/1996 Downs ...................... C02F 1/74
                                                                                  210/724
5,560,894 A    10/1996 Ueno et al.
(Continued)

FOREIGN PATENT DOCUMENTS

CA          2149572 A1 * 11/1995 ................ C02F 1/74
CN      101557868 A  * 10/2009 ........... B01D 53/504
(Continued)

*Primary Examiner* — Timothy Vanoy
(74) *Attorney, Agent, or Firm* — Rabin & Berdo, P.C.

(57) ABSTRACT

In order to reduce energy consumed for waste water treatment, in a scrubber, an exhaust gas is purified into a purified gas by bringing $SO_2$ contained in the exhaust gas into contact with cleaning seawater and $SO_2$-absorbed cleaning seawater is discharged as waste water. Then, a flow rate and a concentration of $SO_2$ of the exhaust gas and a concentration of $SO_2$ of the purified gas are measured. These measurement values are used as a basis to calculate an amount of $HSO_3^-$ obtained by being absorbed into the cleaning seawater, and an amount of dilution seawater in accordance with this calculation result is supplied to the waste water.

15 Claims, 6 Drawing Sheets

(51) Int. Cl.
*B01D 53/78* (2006.01)
*C02F 1/66* (2006.01)
*C02F 1/68* (2006.01)
*C02F 1/74* (2006.01)
*B01D 53/73* (2006.01)
*C02F 1/00* (2006.01)
*B01D 53/34* (2006.01)
*B01D 53/92* (2006.01)
*C02F 103/34* (2006.01)

(52) U.S. Cl.
CPC ........... *B01D 53/504* (2013.01); *B01D 53/73* (2013.01); *B01D 53/92* (2013.01); *C02F 1/008* (2013.01); *C02F 1/66* (2013.01); *C02F 1/686* (2013.01); *C02F 1/74* (2013.01); *B01D 2251/304* (2013.01); *B01D 2251/402* (2013.01); *B01D 2251/404* (2013.01); *B01D 2251/604* (2013.01); *B01D 2251/606* (2013.01); *B01D 2252/1035* (2013.01); *B01D 2259/4566* (2013.01); *C02F 2103/34* (2013.01); *C02F 2209/38* (2013.01)

(58) Field of Classification Search
CPC ........ B01D 2251/404; B01D 2251/604; B01D 2252/1035; B01D 2259/4566; B01D 53/502; B01D 53/73; B01D 53/504; B01D 2258/01; B01D 2258/012; C02F 1/74; C02F 2103/34; C02F 1/686; C02F 1/66; C02F 2209/38; C02F 1/008; C02F 2103/08; C02F 1/68
See application file for complete search history.

(56) References Cited

U.S. PATENT DOCUMENTS

| | | | |
|---|---|---|---|
| 2010/0206171 A1* | 8/2010 | Peng | B01D 53/1481 96/235 |
| 2011/0045133 A1 | 2/2011 | Furling | |
| 2014/0224731 A1* | 8/2014 | Brogaard | C02F 1/008 210/632 |
| 2016/0317968 A1* | 11/2016 | Takahashi | B01D 53/1412 |
| 2017/0165609 A1* | 6/2017 | Norling | B01D 53/79 |

FOREIGN PATENT DOCUMENTS

| | | | | |
|---|---|---|---|---|
| CN | 102387850 A | | 3/2012 | |
| CN | 103282101 A | | 9/2013 | |
| CN | 105899281 A | * | 8/2016 | ......... B01D 53/1412 |
| EP | 2955345 A1 | | 12/2015 | |
| JP | S49-110570 A | | 10/1974 | |
| JP | H06-198126 A | | 7/1994 | |
| JP | H09-239233 A | | 9/1997 | |
| JP | 2005-066505 A | | 3/2005 | |
| JP | 2006-055779 A | | 3/2006 | |
| JP | 2008-207149 A | | 9/2008 | |
| JP | 2011-512811 A | | 4/2011 | |
| JP | 2011-524800 A | | 9/2011 | |
| JP | 2011-524800 A | | 9/2011 | |
| JP | 2013-154329 A | | 8/2013 | |
| WO | WO 2014-118819 A1 | | 8/2014 | |
| WO | WO 2014119513 A1 | * | 8/2014 | ......... B01D 53/507 |

* cited by examiner

EXHAUST GAS TREATMENT DEVICE AND WASTE WATER TREATMENT METHOD FOR EXHAUST GAS TREATMENT DEVICE

CROSS REFERENCE TO RELATED APPLICATION

This is a continuation of International Application No. PCT/JP2015/071655, with an international filing date of Jul. 30, 2015, which is herein incorporated by reference in its entirety. This application claims priority to Japan patent application serial no. 2014-177612 filed 2 Sep. 2014, the contents of which are hereby incorporated by reference.

BACKGROUND OF THE INVENTION

1. Field of the Invention

The present invention relates to an exhaust gas treatment device for purifying exhaust gas by bringing the exhaust gas into contact with seawater and also relates to a waste water treatment method for the exhaust gas treatment device.

2. Description of the Related Art

In thermal power plants, chemical industry plants, waste incinerator facility, and ship and vessel, there are used engines and boilers using fossil fuels. From these engines and boilers, exhaust gas is discharged containing sulfur (mainly ($SO_2$), and for environmental conservation, this $SO_2$ needs to be eliminated to a fixed level by an exhaust gas treatment device. The exhaust gas treatment device is a device that uses alkaline absorbent and brings exhaust gas into contact with alkaline absorbent in a scrubber (absorption tower) to absorb $SO_2$ thereby to remove $SO_2$ (wet desulfurization) (for example, see patent literatures 1 and 2).

In patent literatures 1 and 2, when $SO_2$ in exhaust gas is removed, cleaning seawater is charged as alkaline absorbent into a scrubber, and this cleaning seawater absorbs $SO_2$ thereby to produce waste water having a pH (hydrogen ion concentration) of about 3-5. This waste water is charged from the scrubber into a waste water treatment tank. In the waste water treatment tank, waste water is mixed with dilution seawater that is pumped up by a seawater pump, and then, a resultant is subjected to aeration treatment via a nozzle or the like. By this aeration treatment, pH in the waste water increases, and thereby, it becomes possible to discharge the waste water as quality-improved water into sea in a sea area excluding the Emission Control Area (ECA).

The following documents constitute related art with respect to the present invention:

Patent Literature 1: Japanese Patent Application Publication No. 2006-55779

Patent Literature 2: Japanese Patent Application Publication No. 2011-524800

However, in the methods disclosed in the patent literatures 1 and 2, the amount of dilution seawater becomes two to six times greater than the amount of cleaning water (see the report from United States Environmental Protection Agency announced in 2011, "Exhaust Gas Scrubber Wash Water Effluent"). Since this large amount of dilution seawater is pumped up and used, there arises a problem that the energy consumed for seawater pump becomes large. This problem is more significant particularly in ships and vessels because the energy available on ships or vessels in passage is limited.

SUMMARY OF THE INVENTION

Some embodiments of the present application were carried out in view of the foregoing and aims to provide an exhaust gas treatment device capable of reducing energy consumed for waste water treatment and also to provide a waste water treatment method for the exhaust gas treatment device.

The present invention provides an exhaust gas treatment device, including a scrubber configured to purify an exhaust gas into a purified gas by bringing $SO_2$ contained in the exhaust gas into contact with cleaning seawater and for discharging $SO_2$-absorbed cleaning seawater as waste water; a first measurer configured to measure a flow rate of the exhaust gas before the exhaust gas is charged into the scrubber; a second measurer configured to measure a concentration of $SO_2$ of the exhaust gas before the exhaust gas is charged into the scrubber; a third measurer configured to measure a concentration of $SO_2$ of the purified gas; and a controller configured to calculate an amount of $HSO_3^-$ of the waste water based on measurement values of the first through third measurers to thereby obtain a calculation result, and configured to supply an amount of alkaline substance, in accordance with the calculation result, to the waste water.

According to the above-described exhaust gas treatment device, the amount of alkaline substance is controlled in accordance with the above-mentioned flow rates and the $SO_2$ concentration. With this structure, it is possible to favorably improve the water quality of the waste water to which the alkaline substance is supplied and also possible to prevent unnecessary supply of the alkaline substance. This further enables reduction of energy consumed for devices including a pump for supplying the alkaline substance. Further, it is also possible to reduce the amount of waste water to be treated, thereby enabling reduction of energy consumed for devices driven for waste water treatment (e.g., device for aeration treatment) and shortening of its treatment time.

In the above-described exhaust gas treatment device, the controller can supply the alkaline substance to the waste water so that a total sum of alkaline ions of the alkaline substance and alkaline ions of the cleaning seawater is greater than a number of moles of $HSO_3^-$ of the waste water.

Further, in the above-described exhaust gas treatment device, the controller can supply the alkaline substance to the waste water so that a total sum of alkaline ions of the alkaline substance and alkaline ions of the cleaning seawater is equal to or more than twice and equal to or less than 2.33 times a number of moles of $HSO_3^-$ of the waste water. With this structure, it is possible to make a pH of the treated water suitable for release into sea and also possible to prevent excessive supply of the alkaline substance effectively.

Furthermore, in the above-described exhaust gas treatment device, the controller can update the total sum of the alkaline ions of the alkaline substance and the alkaline ions of the cleaning seawater in accordance with a navigation area.

Furthermore, in the above-described exhaust gas treatment device, a fourth measurer is provided for measuring a flow rate of the cleaning seawater to be supplied to the scrubber. The controller calculates the amount of alkaline substance to be supplied to the waste water, based on a measurement value of the fourth measurer and the amount of $HSO_3^-$ of the waste water.

Furthermore, in the above-described exhaust gas treatment device, the controller can calculate the amount of $HSO_3^-$ of the waste water at given time intervals and use a calculation result as a basis to update the amount of alkaline substance to be supplied to the waste water.

Furthermore, in the above-described exhaust gas treatment device, the alkaline substance can be seawater. Accordingly, it is possible to reduce the amount of seawater to be supplied to the waste water treatment tank.

Furthermore, in the above-described exhaust gas treatment device, the alkaline substance can be at least one of NaOH water solution, $Mg(OH)_2$ slurry solution, $Ca(OH)_2$ slurry solution, and $CaCO_3$ slurry solution. Accordingly, it is possible to drastically reduce the relative amount of alkaline substance to the cleaning seawater.

Furthermore, in the above-described exhaust gas treatment device, the controller can charge the waste water to which the alkaline substance is supplied into the scrubber and circulate the waste water to use as the cleaning seawater.

Furthermore, in the above-described exhaust gas treatment device, the controller can switch between charging the waste water to which the alkaline substance is supplied into the scrubber and externally discharging the waste water.

Furthermore, in the above-described exhaust gas treatment device, the controller can calculate a desulfurization rate of the scrubber based on measurement values of the second and third measurers and controls a flow rate of the cleaning seawater based on the desulfurization rate.

Yet furthermore, in the above-described exhaust gas treatment device, the controller can performs aeration treatment on the waste water by mixing air into the waste water.

The present invention also provides a waste water treatment method for an exhaust gas treatment device, including purifying an exhaust gas charged in a scrubber into a purified gas by bringing $SO_2$ contained in the exhaust gas into contact with cleaning seawater and discharging $SO_2$-absorbed cleaning seawater as waste water; measuring a flow rate and a concentration of $SO_2$ of the exhaust gas before the exhaust gas is charged into the scrubber, a concentration of $SO_2$ of the purified gas and a flow rate of the cleaning seawater to be supplied to the scrubber; calculating an amount of $HSO_3^-$ of the waste water based on measurement values used in the measuring to thereby obtain a calculation result; and supplying an amount of alkaline substance in accordance with a calculation result to the waste water.

Further, the present invention provides an exhaust gas treatment device including a scrubber configured to purify an exhaust gas into a purified gas by bringing $SO_2$ contained in the exhaust gas into contact with cleaning seawater and for discharging $SO_2$-absorbed cleaning seawater as waste water; a first measurer configured to measure a flow rate of the exhaust gas before the exhaust gas is charged into the scrubber; a second measurer configured to measure a concentration of $SO_2$ of the exhaust gas before the exhaust gas is charged into the scrubber; a third measurer configured to measure a concentration of $SO_2$ of the purified gas; and a controller configured to calculate an amount of $HSO_3^-$ of the waste water based on measurement values of the first through third measurers to thereby obtain a calculation result, and configured to supply an amount of cleaning seawater in accordance with the calculation result to the scrubber.

Furthermore, the present invention provides a waste water treatment method for an exhaust gas treatment device, including purifying an exhaust gas charged in a scrubber into a purified gas by bringing $SO_2$ contained in the exhaust gas into contact with cleaning seawater and discharging $SO_2$-absorbed cleaning seawater as waste water; measuring a flow rate and a concentration of $SO_2$ of the exhaust gas before the exhaust gas is charged into the scrubber, a concentration of $SO_2$ of the purified gas and a flow rate of the cleaning seawater to be supplied to the scrubber; calculating a desulfurization rate based on measurement values in said measuring to thereby obtain a first calculation result; supplying a flow rate of cleaning seawater, in accordance with the first calculation result, to the scrubber; calculating an amount of $HSO_3^-$ of the waste water based on measurement values in the measuring to thereby obtain a second calculation result; and supplying an amount of alkaline substance, in accordance with the second calculation result, to the waste water.

According to the present invention, the amount of alkaline substance to be supplied to waste water is controlled in accordance with the aforementioned measurement value. With this structure, it is possible to reduce energy consumed for waste water treatment.

DETAILED DESCRIPTION OF THE INVENTION

Figure 1:
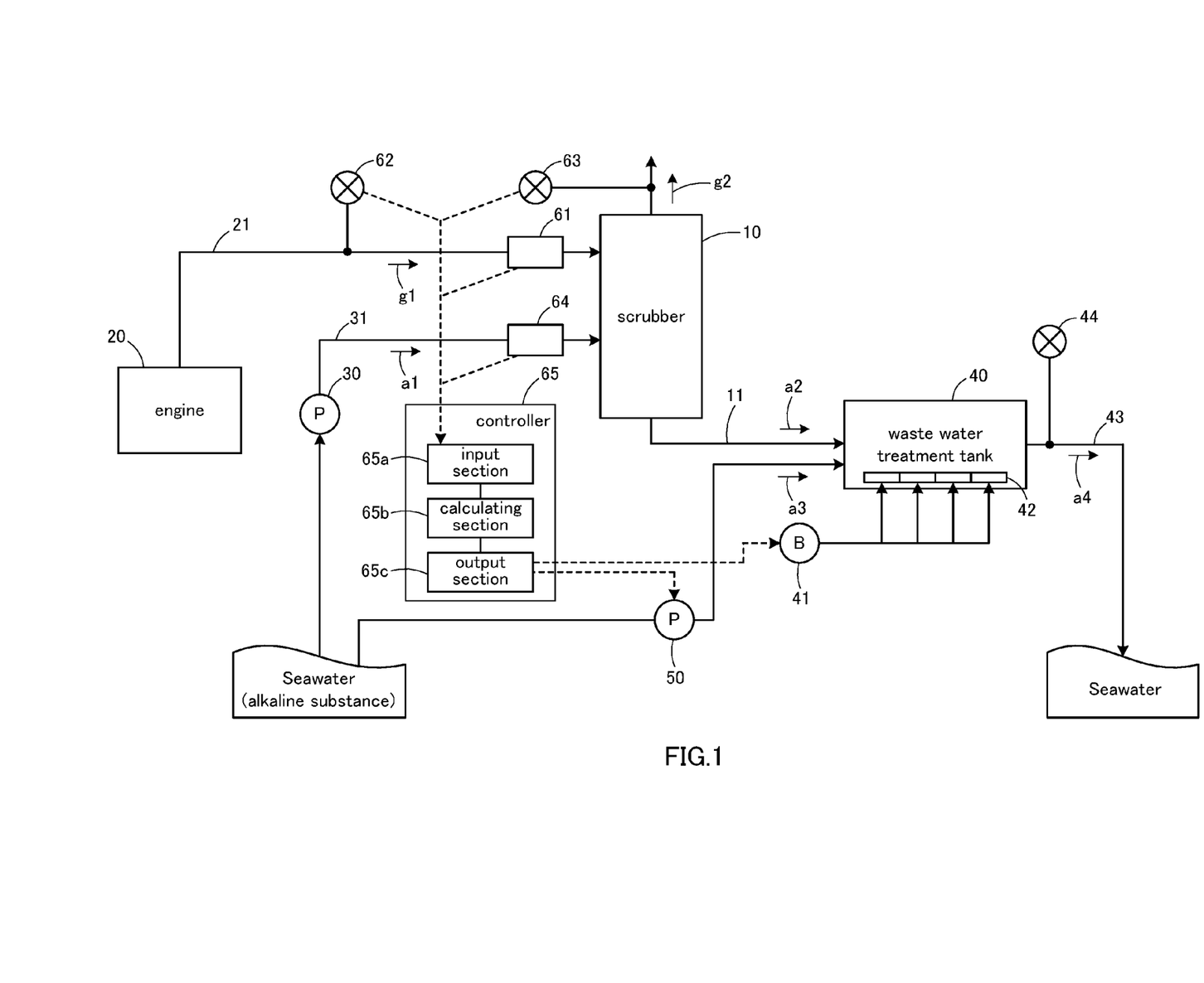
FIG. 1 is a diagram schematically illustrating an exhaust gas treatment device according to a first embodiment.

With reference to the accompanying drawings, embodiments of the present invention will be described in detail below. FIG. 1 is a diagram schematically illustrating an exhaust gas treatment device according to the first embodiment. The exhaust gas treatment device according to the present embodiment is assumed to be a device for purifying exhaust gas that is discharged from an engine used in a ship or vessel. However, this exhaust gas treatment device is not limited thereto; the exhaust gas treatment device according to the present embodiment is also applicable to exhaust gas treatment in thermal power plants, chemical industry plants, and waste incinerator facility.

In this description and claims, "alkaline ions" are described as meaning "$OH^-$ ions" (hydroxide ions), "$HCO_3^-$ ions" (hydrogen carbonate ions) or "$CO_3^{2-}$ ions" (carbonate ions).

As illustrated in FIG. 1, the exhaust gas treatment device is configured to include a scrubber 10 to which an exhaust gas g1 is charged from an engine 20, a first seawater pump 30 for charging a cleaning seawater a1 into the scrubber 10, a waste water treatment tank 40 to which waste water a2 is charged from the scrubber 10, and a second seawater pump (charging unit) 50 for charging a dilution seawater a3 (alkaline substance) into the waste water treatment tank 40. When the exhaust gas treatment device according to the present embodiment is applied to various plants, the engine 20 may be replaced with a boiler.

The exhaust gas g1 discharged from the engine 20 is introduced into the scrubber 10 via an exhaust gas pipe 21. This exhaust gas g1 contains $SO_2$ (sulfur dioxide). Besides, in the scrubber 10, the cleaning seawater a1 is charged via a cleaning seawater pipe 31 by driving the first seawater pump 30. The cleaning seawater a1 charged in the scrubber 10 is sprayed by a plurality of nozzles (not shown) and is brought into gas-liquid contact with the exhaust gas g1 moving up in the scrubber 10.

$SO_2$ in the exhaust gas g1 is absorbed into the cleaning seawater a1 and dissociated into hydrogen ions ($H^+$) and sulfite ions ($HSO_3^-$), as shown in the following formula (1). In addition, a part of the hydrogen ions acts with hydrogen carbonate ions ($HSO_3^-$) in the cleaning seawater a1, as shown in the following formula (2).

$$SO_2(gas)+H_2O \rightarrow H_2SO_3 \rightarrow H^+ + HSO_3^- \quad (1)$$

$$H^+ + HCO_3^- \rightarrow H_2O + CO_2(aq) \quad (2)$$

In the scrubber 10, $SO_2$ in the exhaust gas g1 is absorbed by the cleaning seawater a1 and removed. Therefore, the exhaust gas g1 is purified in the scrubber 10 to be a purified gas g2 and is discharged from the upper part of the scrubber 10 into the air. Besides, in the scrubber 10, the $SO_2$-absorbed cleaning seawater a1 becomes the waste water a2, and in the waste water a2, sulfite ions ($HSO_3^-$) and carbonic acid ($CO_2$) are dissolved. Therefore, the pH (hydrogen ion exponent) of the waste water a2 is about 3 to 5. The waste water a2 in the scrubber 10 drops down along the inner wall surface of the scrubber 10 by its own weight, and stored in a storage at the bottom part of the scrubber 10, and then passes through the waste water pipe 11 and is discharged to the waste water treatment tank 40.

The waste water a2 charged in the waste water treatment tank 40 needs to be subjected to deacidification so that the water can be released into the sea. In order to meet this need, in the waste water treatment tank 40, the dilution seawater a3 is supped by the second seawater pump 50, and this dilution seawater a3 is mixed with the waste water a2 from the scrubber 10 so that the waste water a2 is diluted. In addition, in the waste water treatment tank 40, aeration treatment is carried out such that air is mixed into the diluted waste water a2 by a blower 41 as an air supply device. For example, the aeration treatment is performed by making air from the blower 41 blow out as fine air bubbles from nozzles 42 in the waste water treatment tank 40 and bringing them into contact with the diluted waste water a2 in the waste water treatment tank 40. The aeration treatment in the waste water treatment tank 40 is expressed by the following reaction formulas (3) to (5).

$$HSO^{3-} + (1/2)O_2 \rightarrow H^+ + SO_4^{2-} \quad (3)$$

$$H^+ + HCO_3 \rightarrow H_2O + CO_2(aq) \quad (4)$$

$$CO_2(aq) \rightarrow CO_2(gas)\uparrow \quad (4)$$

By the above-described reaction, in the dilution seawater a3 and waste water a2 mixed in the waste water treatment tank 40, sulfite ions ($HSO_3^-$) is oxidized and sulfate ion ($SO_4^{2-}$) remains so that the water is neutralized. Then, quality-improved water a4 becomes able to be released into sea. Here, the discharge path 43 for the quality-improved water a4 discharged from the waste water treatment tank 40 is provided with a measurement device 44 for measuring the pH of the quality-improved water a4.

Next description is made about the configuration for controlling a supply flow rate of dilution seawater a3 by the second seawater pump 50. For this control, the exhaust gas treatment device is equipped with first through fourth measurement units (measurers) 61 to 64 and a controller 65.

The first measurement unit 61 is installed in the exhaust gas pipe 21 and is configured of a mass flow meter for measuring a flow rate of exhaust gas g1 before being charged into the scrubber 10. The second measurement unit 62 is installed on the exhaust gas pipe 21 and is configured of a laser gas analyzer for measuring the concentration of $SO_2$ of the exhaust gas g1 before being charged into the scrubber 10. The third measurement unit 63 is installed on the outlet side of the purified gas g2 and is configured of a laser gas analyzer for measuring the concentration of $SO_2$ of the purified gas g2 after passing through the scrubber 10. The fourth measurement unit 64 is installed at the cleaning seawater pipe 31 and is configured of a mass flow meter for measuring a flow rate of the cleaning seawater a1 charged into the scrubber 10. Each of the measurement units 61 to 64 is configured to be able to measure fluctuation of a measurement target continuously. Note that the measurement units 61 to 64 are each described as an example and may have any configuration as long as it is able to measure fluctuation of the measurement target continuously, for example, a meter other than a mass flow meter, or a sensor.

The controller 65 is configured, for example, to have a processor for executing various processes required for controlling the supply of dilution seawater a3 and a programmable controller (PLC) including a storage medium such as a ROM (Read Only Memory) or RAM (Random Access Memory). The controller 65 is connected to the measurement units 61 to 64 and to second seawater pump 50 via given signal lines. The measurement results of the measurement units 61 to 64 are output as electric signals to the controller 65. The controller 65 computes an optimal supply flow rate for the dilution seawater a3 by the second seawater pump 50 based on a calculation result output from each of the measurement units 61 to 64. The controller 65 outputs an electric signal based on a computing result to the second seawater pump 50 and controls driving of the second seawater pump 50. The second seawater pump 50 is preferably inverter-controlled by the controller 65.

The supply flow rate of the dilution seawater a3 by the second seawater pump 50 is, for example, computed as explained below. In the following computing expression, "C1" denotes the concentration of $SO_2$ of the exhaust gas g1 to be measured at the second measurement unit 62 before the gas is charged into the scrubber 10, "C2" denotes the concentration of $SO_2$ of purified gas g2 to be measured at the third measurement unit 63 after the gas passes through the scrubber 10, and their measurement units are ppm. In addition, "G" denotes a flow rate of the exhaust gas g1 to be measured at the first measurement unit 61 before the gas is charged into the scrubber 10, and its measurement unit is $Nm^3$ (normal $m^3$)/h. "W" denotes the flow rate of the cleaning seawater a1 charged into the scrubber 10 to be measured at the fourth measurement unit 64, and its measurement unit is $m^3$/h.

First, the amount "S1" of $HSO_3^-$ ions absorbed into the cleaning seawater a1 (unit: mol/h) is calculated by the following expression (6). The volume of gas per mol is 22.4 little.

$$S1=(C1-C2)/22.4 \times G \times 10^{-3} \quad (6)$$

Then, assuming the flow rate of dilution seawater a3 is Q1 ($m^3$/h), the amount "S2" of $HCO_3^-$ ions (alkaline ions) in whole the seawater supplied, that is, a sum of cleaning seawater a1 and dilution seawater a3 (unit: mol/h) is calculated by the following expression (7). Expression (7) assumes that the concentration of alkaline ions in the seawater is $2.0 \times 10^{-3}$ mol/L, however the concentration may vary depending on the weather and the sea area. Thus, it is preferable that the concentration of alkaline ions in the seawater is analyzed at regular intervals and its variation is reflected on the expression (7). For example, there may be provided a GPS for measuring the current location and outputting a navigation area information based on the current location. The controller 65 may update the concentration of alkaline ions in the seawater based on the navigation area information. The concentration of alkaline ions in the seawater corresponding to the navigation area may be stored in advance in the controller 65 or may be measured by using an alkalinity analyzer.

$$S2 = \text{(amount of HCO}_3^- \text{ ions of dilution seawater)} + \quad (7)$$
$$\text{(amount of HCO}_3^- \text{ ions of cleaning seawater)}$$
$$= (2.0 \times 10^{-3} \times Q1 \times 10^3) + (2.0 \times 10^{-3} \times W \times 10^3)$$
$$= 2Q1 \times 2W$$

Then, using the calculation results of the expressions (6) and (7), an optimal flow rate Q1 of the dilution seawater a3 is calculated by the following expression (8). In this calculation, the waste water a2 in the waste water treatment tank 40 needs to be changed into quality-improved water a4. Then, an inequality expression is used in which the sum "S2" of $HCO_3^-$ ions (alkaline ions) obtained from the cleaning seawater a1 and the dilution seawater a3 becomes larger than the amount "S1" of $HSO_3^-$ absorbed into the cleaning seawater a1 multiplied by coefficient "A".

(sum "S2" of $HCO_3^-$ ions of cleaning seawater and dilution seawater)>$A$×(amount of $HSO_3^-$ ions obtained by being absorbed into the cleaning seawater)

$S2 > A \times S1$ $2Q1 + 2W > A \times \{(C1-C2)/22.4 \times G \times 10^{-3}\}$ $$Q1 > [A \times \{(C1-C2)/22.4 \times G \times 10^{-3}\} - 2W]/2 \quad (8)$$

As explained above, the flow rate Q1 of the dilution seawater a3 supplied to the waste water treatment tank 40 becomes larger than a calculation result of the right side of the expression (8). In actual operation, in order to make the flow rate Q1 larger than the calculation result of the right side of the expression (8), the right side of the expression (8) is multiplied by about 1.05 to 1.15 and a resultant flow rate Q1 may be used as a set value. The calculations of the above-mentioned expressions (6) to (8) may be performed at intervals of several minutes (for example, five minutes) by the controller 65 so that the flow rate Q1 of the dilution seawater a3 can be updated.

Figure 2:
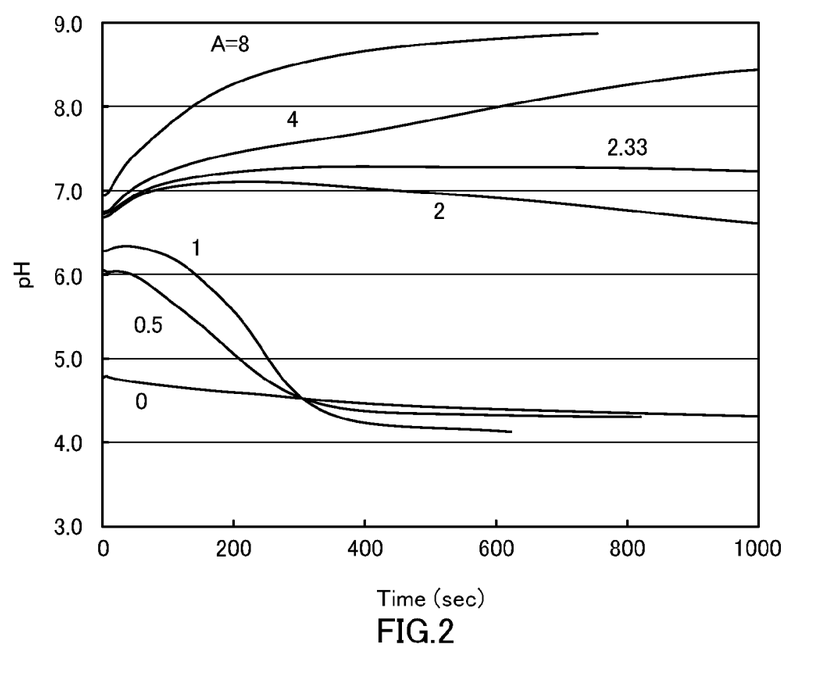
FIG. 2 is a graph showing a result of consecutive measurements of pH in a waste water treatment tank according to the first embodiment.

Here, with reference to FIG. 2, description is made about the setting of the coefficient A in the expression (8). FIG. 2 is a graph showing consecutive measurement results of pH of the waste water treatment tank 40 as the amount of seawater varies. In FIG. 2, the pH results are achieved by changing the coefficient A in the following expression (9) from 0, 0.5, 1, 2, 2.33, 4, to 8.

$$A = \text{(Amount of HCO}_3^- \text{ ions (alkaline ions) supplied from seawater)/(amount of HSO}_3^- \text{ions obtained by being absorbed into cleaning seawater)} \quad (9)$$

From the results in FIG. 2, the treated water a4 that is treated in the waste water treatment tank 40 has a pH of 6.5 to 8.6 on the condition of A≥2 and the treated water a4 is able to be released into sea on the same condition. On the other hand, the treated water a4 shows a PH that allows release into sea even on the conditions of A=4 or 8, but, the dilution seawater a3 is supplied excessively. According to the present embodiment, in the range of 2≤A≤2.33, pH becomes about 7. That is, if A satisfies 2≤A≤2.33, the treated water a4 can be kept such that the water quality is high enough to release the water into the sea, the amount of dilution seawater a3 can be kept, for example, smaller than or equal to twice the amount of cleaning seawater a1 and be prevented from increasing excessively and thereby, it is possible to reduce energy consumption at the second seawater pump 50.

Then, returning to FIG. 1, description is made about the configuration of the above-mentioned controller 65. In FIG. 1, the controller 65 is described as a functional block. The functional block of the controller 65 illustrated in FIG. 1 is illustrated only as to a structure related to the present invention, with the other structures omitted.

As illustrated in FIG. 1, the controller 65 is configured to include an input section 65a, a calculating section 65b and an output section 65c. The input section 65a inputs measurement values of flow rates and concentration from the first to fourth measurement units 61 to 64 as electric signals. The calculating section 65b calculates the amount "S1" of $HSO_3^-$ obtained by being absorbed into the cleaning seawater a1 indicated by the above-mentioned expression (6) and the sum "S2" of amount of $HCO_3^-$ ions of the cleaning seawater a1 and the dilution seawater a3 indicated by the expression (7). Then, in accordance with calculation results of these amounts "S1" and "S2", an appropriate flow rate "Q1" of dilution seawater a3 indicated by the expression (8) is calculated. The output section 65c outputs an electric signal for controlling the second seawater pump 50 in accordance with the calculation result of the flow rate "Q1" of the calculating section 65b. In addition, the output section 65c outputs an electric signal for spraying fine air bubbles from nozzles 42 in the waste water treatment tank 40 via the blower 41.

Figure 3:
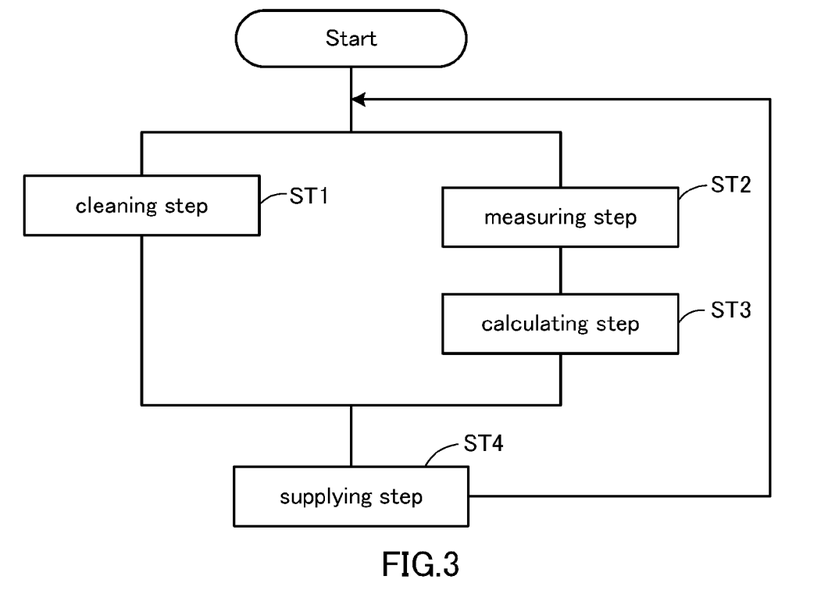
FIG. 3 is a flowchart for explaining steps of a waste water treatment method according to the first embodiment.

Then, with reference to FIGS. 1 to 3, description is made about the waste water treatment method in the above-described exhaust gas treatment device. FIG. 3 is a flowchart for explaining the steps of the waste water treatment method. As illustrated in FIG. 3, the waste water treatment method according to the present embodiment, there are performed a purifying step (ST1), a measuring step (ST2), a calculating step (ST3) and a supplying step (ST4).

First, in the purifying step (ST1), an exhaust gas g1 from an engine 20 is charged via the exhaust gas pipe 21 into the scrubber 10. In the meantime, in the scrubber 10, by driving the first seawater pump 30, the cleaning seawater a1 passes through the cleaning seawater pipe 31 and is sprayed in the scrubber 10. With this structure, $SO_2$ contained in the exhaust gas g1 and the sprayed cleaning seawater a1 are brought into contact with each other so that $SO_2$ is absorbed into the cleaning seawater a1, and then, the exhaust gas g1 is purified into the purified gas g2, which is discharged from the scrubber 10. The $SO_2$-absorbed cleaning seawater a1 is charged from the scrubber 10 into the waste water treatment tank 40 as the waste water a2.

The measuring step (ST2) is performed while the above-mentioned purifying step is performed. In the measuring step, the first measurement unit 61 measures a flow rate of the exhaust gas g1 flowing in the exhaust gas pipe 21 before being charged into the scrubber 10. The second measurement unit 62 measures the concentration of $SO_2$ of the exhaust gas g1. The third measurement unit 63 measures the concentration of $SO_2$ of the purified gas g2 after passing through the outlet side of the scrubber 10. The fourth measurement unit 64 measures a flow rate of the cleaning seawater a1 flowing in the cleaning seawater pipe 31 before being charged into the scrubber 10.

The calculating step (ST3) is performed based on the measurement values in the above-mentioned measuring step. In the calculating step, first, as described above, the controller 65 is used to calculate the amount of $HSO_3^-$ obtained by being absorbed into the cleaning seawater a1, and in accordance with this calculation result, an appropriate amount of dilution seawater a3 is obtained.

After the purifying step (ST1) and calculating step (ST3), the supplying step (ST4) is performed. In the supplying step (ST4), the controller 65 controls driving of the second seawater pump 50 in accordance with the calculation result in the calculating step so that the dilution seawater a3 is supplied to the waste water treatment tank 40. Then, in the waste water treatment tank 40, the waste water a2 from the scrubber 10 is mixed and diluted with the dilution seawater a3 supplied from the second seawater pump 50. Then, in the waste water treatment tank 40, the diluted waste water a2 is subjected to the aeration treatment and the waste water a2 is released as quality-improved treatment water a4 into sea. The treated water a4 is measured as to pH by the measurement device 44 before being released into sea. Mixing and aeration treatment of the waste water a2 and the dilution seawater a3 may be performed simultaneously. Even if they are performed simultaneously, the waste water a2 is released as quality-improved treated water a4 into sea.

As described up to this point, according to the waste water treatment method according to the present embodiment, the dilution seawater a3 for diluting the waste water a2 is adjusted to an appropriate amount in accordance with the measurement values of the first to fourth measurement units 61 to 64, which makes it possible to improve the quality of the treated water a4 sufficiently so that the treated water a4 can have a pH enough to be released into sea, and also possible to reduce the amount of dilution seawater a3. With this structure, it is possible to reduce wastes of power consumption for driving the second seawater pump 50 and reduce the amount of diluted waste water a2, thereby enabling reduction in power consumption for driving the blower 41 in the aeration treatment and shortening the time for the aeration treatment.

In the above description, the flow rate of the cleaning seawater a1 may be a set value that is determined in advance or may be a value that is determined separately. Or, as in the second embodiment of the present invention described next, the value may be determined by the controller 65. If the set value determined in advance may be used, the flow rate of the cleaning seawater a1 needs not to be measured by the fourth measurement unit 64. Thus, the fourth measurement unit 64 may be omitted.

Next description is made, with reference to FIG. 4, about the second embodiment of the present invention in detail below. In the second embodiment, elements that are common with the first embodiment are denoted by the same reference numerals and their explanation is omitted here.

Figure 4:
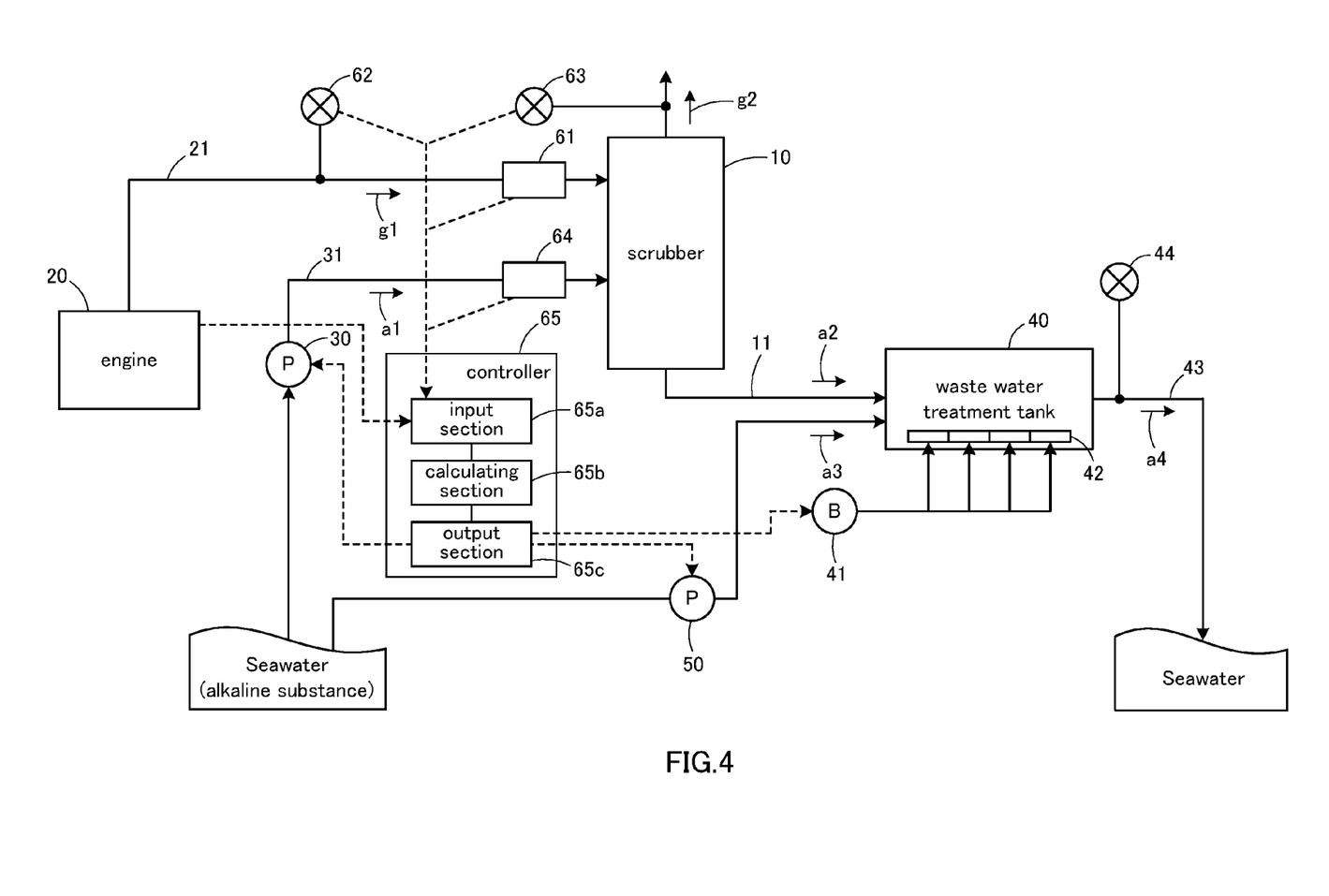
FIG. 4 is a diagram schematically illustrating an exhaust gas treatment device according to a second embodiment.

FIG. 4 is a schematic diagram of the exhaust gas treatment device according to the second embodiment. As illustrated in FIG. 4, in the exhaust gas treatment device according to the present embodiment, it is the controller 65 that determines the flow rate of the cleaning seawater a1. The controller 65 calculates the desulfurization rate ($SO_2$ concentration removal rate) using the concentration of $SO_2$ of the exhaust gas 1 measured by the second measurement unit 62 before being charged into the scrubber 10 and the concentration of $SO_2$ of the purified gas g2 measured by the third measurement unit 63 after passing through the outlet side of the scrubber 10. When the desulfurization rate is lower than a threshold value, the controller 65 controls to drive the first seawater pump 30 so as to increase the flow rate of the cleaning seawater a1. The desulfurization rate is calculated as a ratio of the concentration of $SO_2$ of the purified gas g2 measured by the third measurement unit 63 after passing through the outlet side of the scrubber 10 to the concentration of $SO_2$ of the exhaust gas g1 measured by the second measurement unit 62 before being charged into the scrubber 10 ($SO_2$ concentration of the purified gas g2/$SO_2$ concentration of the exhaust gas g1).

Then, the controller 65 controls driving of the second seawater pump 50 so that the sum of $HCO_3^-$ ions of the cleaning seawater a1 and $HCO_3^-$ ions of dilution seawater is equal to or more than twice and is equal to or less than 2.33 times the moles of $HSO_3^-$ ions obtained by being absorbed into the cleaning seawater a1. With this structure, it is possible to efficiently use the cleaning seawater a1 and the dilution seawater a3. For example, if the flow rate of the cleaning seawater a1 is increased so as to increase the desulfurization rate, it is possible to reduce the dilution seawater a3 by the flow amount that is equal to the increased amount of the cleaning seawater a1.

In addition, the controller 65 may control the first seawater pump 30 so that a ratio of $HCO_3^-$ ions of the cleaning seawater a1 to the moles of $HSO_3^-$ ions obtained by being absorbed into the cleaning seawater a1 ranges from 2 to 2.33, inclusive. In this case, the dilution seawater a3 becomes unnecessary, and power of the second seawater pump 50 may be reduced.

Figure 5:
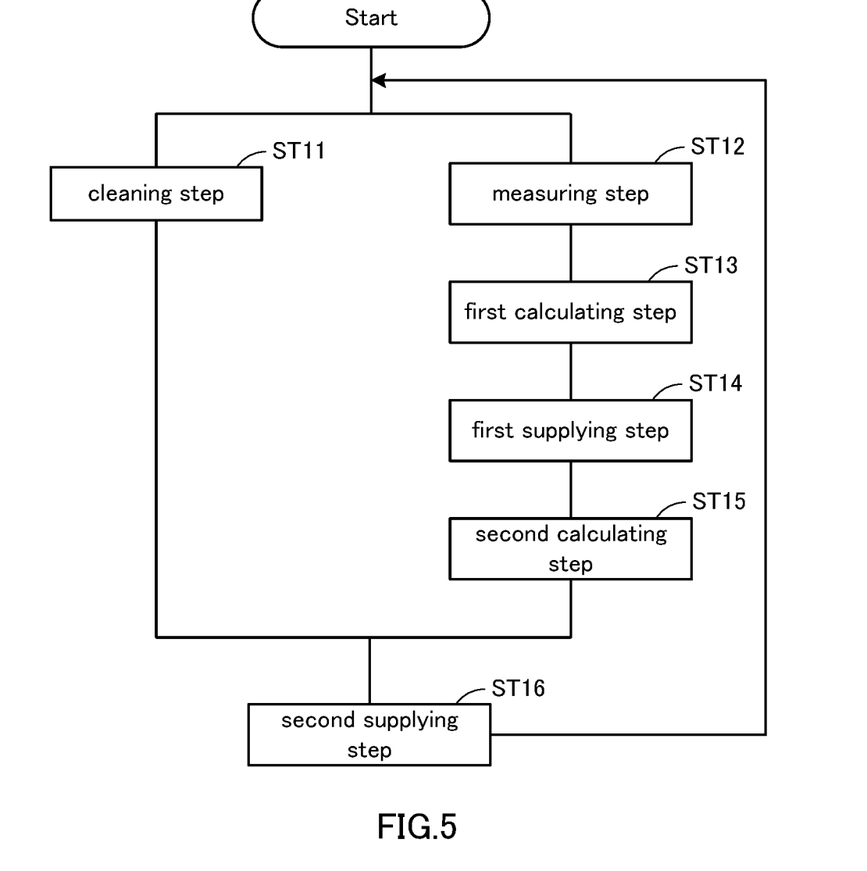
FIG. 5 is a flowchart for explaining steps of a waste water treatment method according to the second embodiment.

Then, with reference to FIGS. 4 and 5, description is made about the waste water treatment method in the exhaust gas treatment device of the second embodiment according to the present invention. FIG. 5 is a flowchart for explaining the flow of the waste water treatment method. As illustrated in FIG. 5, according to the waste water treatment method according to the present embodiment, a purifying step (ST11), a measuring step (ST12), a first calculating step (ST13), a first supplying step (ST14), a second calculating step (ST15) and a second supplying step (ST16) are performed.

First, in the purifying step (ST11), the exhaust gas g1 from the engine 20 passes through the exhaust gas pipe 21 and is charged into the scrubber 10. In the meantime, an output value of the engine 20 is input to the input section 65a of the controller 65. The calculating section 65b calculates the amount of fuel consumption based on the output value of the engine 20. Then, the calculating section 65b calculates the flow rate of the cleaning seawater a1 required for purifying the exhaust gas g1, based on the amount of fuel consumption. Based on this calculation result, the output section 65c drives the first seawater pump 30 to charge a required flow rate of cleaning seawater a1 into the scrubber 10. By driving the first seawater pump 30, the cleaning seawater a1 passes through the cleaning seawater pipe 31 and is sprayed to the exhaust gas g1 in the scrubber 10. With this structure, $SO_2$ contained in the exhaust gas g1 and the sprayed cleaning seawater a1 are brought into contact with each other so that $SO_2$ is absorbed into the cleaning seawater a1, and the exhaust gas g1 is purified and discharged as purified gas g2 from the scrubber 10. The $SO_2$-absorbed cleaning seawater a2 is charged as the waste water a2 from the scrubber 10 into the waste water treatment tank 40.

During the above-mentioned purifying step, the measuring step (ST12) is performed. In the measuring step, the first measuring unit 61 measures the flow rate of the exhaust gas g1 passing through the exhaust gas pipe 21 before being charged into the scrubber 10, and the second measuring unit 62 measures the concentration of $SO_2$ of the exhaust gas g1. The third measuring unit 63 measures the concentration of $SO_2$ of the purified gas g2 passing though the outlet side of the scrubber 10 and the fourth measurement unit 64 measures the flow rate of the cleaning seawater a1 flowing in the cleaning seawater pipe 31 before being charged into the scrubber 10.

Based on the measurement values in the above-mentioned measuring step, the first calculating step (ST13) is performed. In the first calculating step, first, as described above, the controller 65 calculates the desulfurization rate using the concentration of $SO_2$ of the exhaust gas g1 measured by the second measurement unit 62 before being charged into the scrubber 10 and the concentration of $SO_2$ of the purified gas g2 measured by the third measurement unit 63 after passing through the outlet side of the scrubber 10. Then, in accordance with this desulfurization rate, the controller 65 controls driving of the first seawater pump 30 to supply the cleaning seawater a1 into the scrubber 10.

After the first calculating step (ST13) is performed, the first supplying step (ST14) is performed. In the first supplying step, the controller 65 compares the calculated desulfurization rate with a predetermined threshold value. When the desulfurization rate is lower than the threshold value, the controller 65 controls driving of the first seawater pump 30 so as to increase the flow rate of the cleaning seawater a1.

After the first supplying step (ST14), the second calculating step (ST15) is performed based on the measurement values in the above-mentioned measuring step. In the second calculating step, as described above, the controller 65 calculates the amount of $HSO_3^-$ obtained by being absorbed into the cleaning seawater a1 and in accordance with this calculation result, the controller 65 calculates an appropriate amount of dilution seawater a3.

After the purifying section (ST11) and the second calculating section (ST15) are performed, the second supplying section (ST16) is performed. In the second supplying section, the controller 65 controls driving of the second seawater pump in accordance with the calculation result in the second calculating step to supply the dilution seawater a3 to the waste water treatment tank 40. Then, in the waste water treatment tank 40, the waste water a2 from the scrubber 10 is mixed and diluted with the dilution seawater a3 supplied by the second seawater pump 50. Then, in the waste water treatment tank 40, the diluted waste water a2 is subjected to the aeration treatment, and the waste water a2 is released as quality-improved treated water a4 into sea. The treated water a4 is measured as to pH by the measurement device 44 before being discharged into sea. Here, the mixing and aeration treatment of the waste water a2 and the dilution seawater a3 may be performed simultaneously. Even if they are performed simultaneously, the waste water a2 is released as quality-improved treated water a4 into sea.

Then, description is made, with reference to FIG. 6, about the third embodiment of the present invention in detail below. In the third embodiment, elements that are common with the first and second embodiments are denoted by the same reference numerals and their explanation is omitted here.

Figure 6:
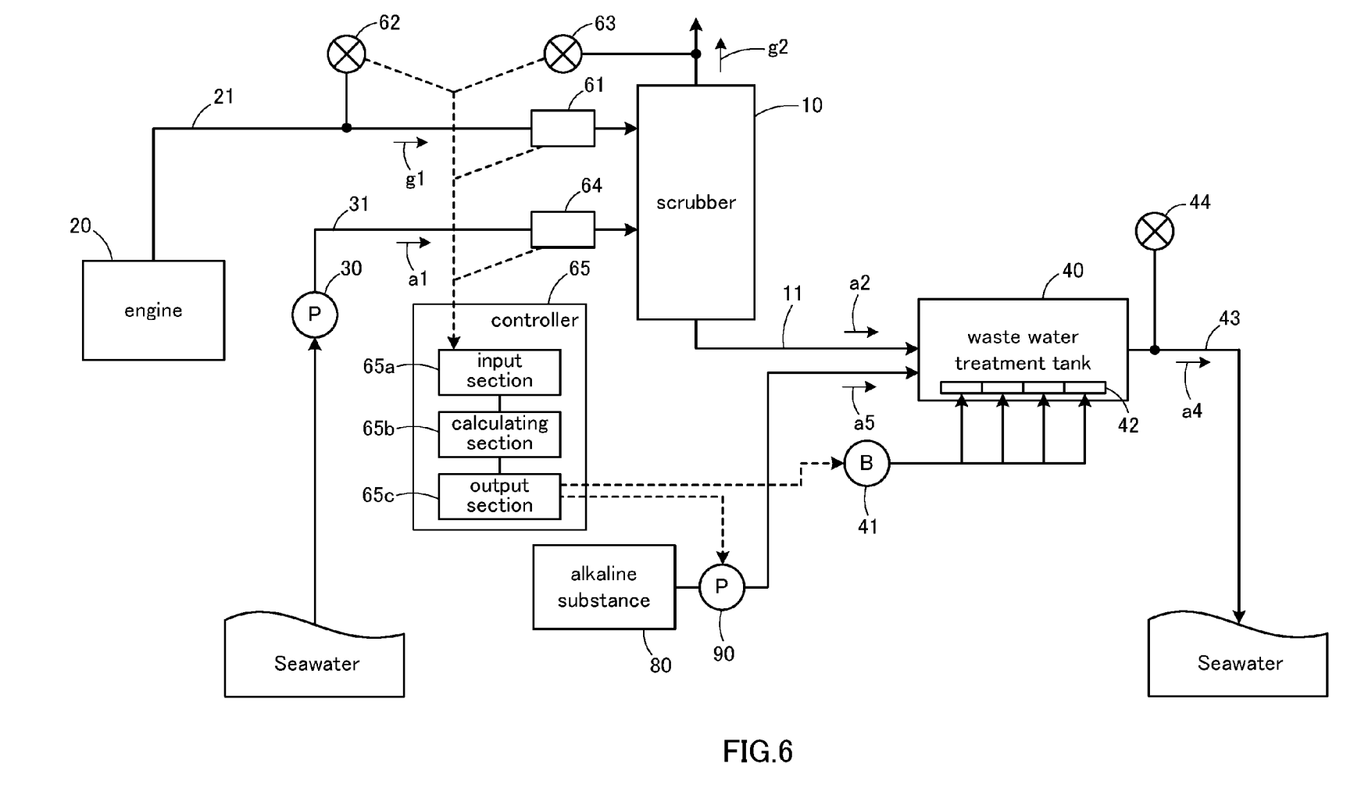
FIG. 6 is a diagram schematically illustrating an exhaust gas treatment device according to a third embodiment.

FIG. 6 is a diagram schematically illustrating the exhaust gas treatment device according to the third embodiment. As illustrated in FIG. 6, the exhaust gas treatment device according to the present embodiment is equipped with a storage tank 80 for alkaline substance a5. An alkaline substance a5 in the storage tank 80 is supplied via a pump 90 as a supplying section to the waste water treatment tank 40 and is mixed with the waste water a2. That is, according to the third embodiment, the alkaline substance a5 in the storage tank 80 is used instead of the dilution seawater a3 in the first embodiment. The pump 90 is controlled by the controller 65 in the same manner as the second seawater pump 50 according to the first embodiment.

The alkaline substance a5 may be, for example, NaOH water solution diluted to a given concentration, $Mg(OH)_2$ slurry solution, $Ca(OH)_2$ slurry solution, or $CaCO_3$ slurry solution, alone or in combination.

Assuming the supply flow rate of the alkaline substance a5 by pump 90 is Q2($m^3$/h), its calculation is changed from the calculation of the flow rate Q1 of the dilution seawater a3 in the first embodiment, in the following points. In the third embodiment, "S2" (unit: mol/h) is the amount of alkaline ions in the sum of cleaning seawater a1 and the alkaline substance a5, which is calculated by the following expression (7a). In the expression (7a), "M" is the concentration of alkaline ions of the alkaline substance a5 (unit: mol/L).

$$S2 = \text{(Amount of alkaline ions of alkaline substance)} + \quad (7a)$$
$$\text{(amount of alkaline ions of cleaning seawater)}$$
$$= (M \times Q2 \times 10^3) + (2.0 \times 10^{-3} \times W \times 10^3)$$
$$= M \times Q2 \times 10^3 + 2W$$

An appropriate flow rate Q2 of the alkaline substance a5 is calculated by the following expression (8a) using the calculation results of the expressions (6) and (7a).

(Sum of alkaline ions of alkaline substance and cleaning seawater)>$A \times$(Amount of $HSO_3^-$ ions obtained by being absorbed into the cleaning seawater)

$S2 > A \times S1$ $M \times Q2 \times 10^3 + 2W > A \times \{(C1-C2)/22.4 \times G \times 10^{-3}\}$ $$Q2 > [A \times \{(C1-C2)/22.4 \times G \times 10^{-3}\} - 2W]/(M \times 10^3) \quad (8a)$$

As described above, the flow rate Q2 of the alkaline substance a5 to be supplied to the waste water treatment tank 40 becomes larger than a calculation result of the right side of the expression (8a). Also in the third embodiment, by setting the coefficient A to meet $2 \leq A \leq 2.33$, the treated water a4 is kept such that water quality is high enough to release the water into sea, the amount of alkaline substance a5 is prevented from being an excess amount, and thereby, it is possible to reduce energy consumption of the pump 90. Here, in actual operation, in order to make the flow rate Q2 larger than the calculation result of the right side of the expression (8a), the right side of the expression (8a) is multiplied by about 1.05 to 1.15 and a resultant flow rate Q2 may be used as a set value. The calculations of the above-mentioned expressions (6), (7a) and (8a) may be performed, for example, at intervals of 5 minutes by the controller 65 so that the flow rate Q2 of the alkaline substance a5 can be updated. Here, in the above-mentioned expression (7a), the concentration of alkaline ions in the sea is set to $2.0 \times 10^{-3}$ mol/L. However, since the concentration may change depending on the weather or sea area, it is preferable that the concentration of alkaline ions in the sea is analyzed at regular intervals to be incorporated into the expression (7a). For example, there may be provided a GPS for measuring the current position and outputting navigation area information based on this current position. The controller 65 may update the concentration of alkaline ions in the seawater based on the navigation area information output from the GPS. The concentration of alkaline ions in the seawater corresponding to the navigation area may be stored in advance in the controller 65 or may be measured by the alkalinity analyzer.

As explained up to this point, according to the third embodiment, in order to neutralize the waste water a2 in the waste water treatment tank 40 to be treated water a4 having quality suitable for release into sea, the alkaline substance a5 such as alkaline water solution or alkaline slurry solution is able to be supplied by an appropriate amount. With this structure, it is possible to reduce waste consumption of the alkaline substance a5.

Further, description is made, with reference to FIG. 7, about the fourth embodiment of the present invention in detail below. In the fourth embodiment, elements that are common with the first, second and third embodiments are denoted by like reference numerals and explanation thereof is omitted here.

Figure 7:
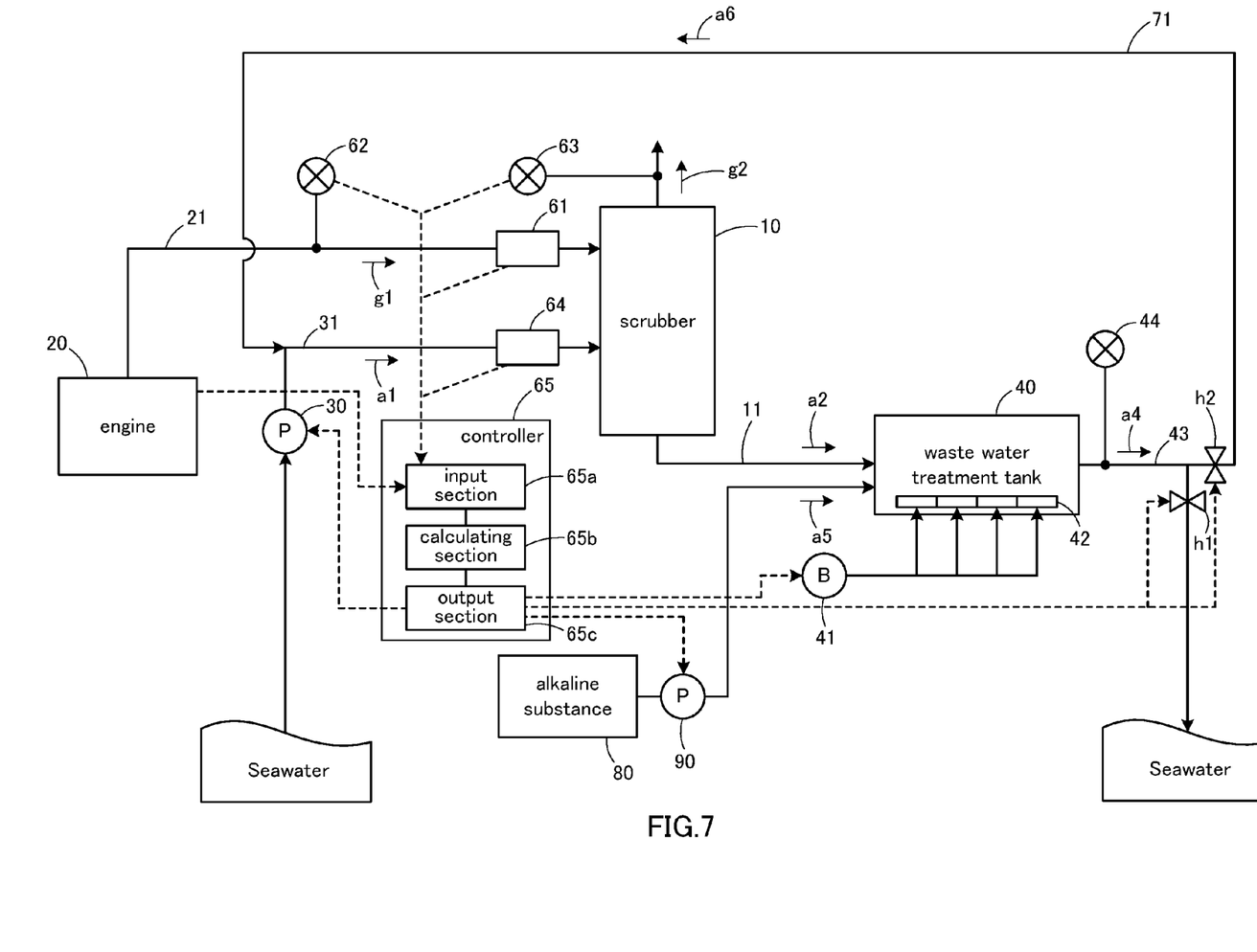
FIG. 7 is a diagram schematically illustrating an exhaust gas treatment device according to a fourth embodiment.

FIG. 7 is a diagram schematically illustrating the exhaust gas treatment device according to the fourth embodiment. As illustrated in FIG. 7, according to the exhaust gas treatment device according to the present embodiment, the treated water a4 is not released into sea, but is used repeatedly. The exhaust gas treatment device according to the present embodiment is equipped with the storage tank 80 for storing the alkaline substance a5, like in the third embodiment. The alkaline substance a5 in the storage tank 80 is supplied to the waste water treatment tank 40 via the pump 90 as a supplying section and is mixed with the waste water a2.

The controller 65 returns the treated water a4, which is quality-improved in the waste water treatment tank 40, to the cleaning seawater pipe 31 by a circulating seawater pipe 71 that is branched off from the discharge path 43 so that the treated water can be circulated to be used as a circulating water a6 (circulating step). The circulating water a6 is supplied to the scrubber 10 as the cleaning seawater via the cleaning seawater pipe 31. The flow rate of the circulating water a6 is measured by the fourth measurement unit 64 before being charged into the scrubber 10. And, the pH of the treated water a4 is measured by the measurement unit 44.

The controller 65 controls open and close of a switch valve h1 and h2 provided at a branch point, based on the measurement value of pH of the measurement unit 44 thereby to be able to switch between releasing the treated water a4 into sea (releasing step) and circulating to use the treated water a4 within the ship or vessel (circulating step) (switching step).

As described up to this point, according to the present embodiment, it is possible to circulate and use the treated water a4 within the ship or vessel. Therefore, even in a navigation area where release of treated water a4 into sea is prohibited by rule or regulation, it is possible to purify the exhaust gas g1 in the scrubber 10 by circulating and using the treated water a4. In addition, it is possible to switch between releasing the treated water a4 into sea and circulating and using the treated water a4 in the ship or vessel, in accordance with a pH limit in the navigation area of the ship. Here, the present embodiment has been described by adding the elements including the circulating seawater pipe 71 to the third embodiment, however, the present embodiment may be an exhaust gas treatment device formed by adding these elements to the first or second embodiment.

EXAMPLES

Next description is made about experiment that was performed for confirming the effects of water quality improvement and energy saving in the waste water treatment method in the above-mentioned embodiments. In example 1 of this experiment, a dilution seawater is used like in the first embodiment. In examples 2 to 4, an alkaline substance is used like in the second embodiment. Specifically, the example 2 uses 50% NaOH water solution, the example 3 uses 35% $Mg(OH)_2$ slurry solution and the example 4 uses 30% $Ca(OH)_2$ slurry solution. The conditions in the following table 1 are determined to be the same in the examples 1 to 4. The concentrations M of alkaline ions of the alkaline substances of the examples 2 to 4 are 12.5 mol/L for example 2, 12.0 mol/L for example 3 and 8.0 mol/L for example 4.

TABLE 1

| | |
|---|---|
| Concentration C1 of $SO_2$ of exhaust gas g1 | 500 ppm |
| Concentration C2 of $SO_2$ of purified gas g2 | 20 ppm |
| Flow rate G of exhaust gas g1 | 60,000 $Nm^3/h$ |
| Flow rate W of cleaning seawater a1 | 500 $m^3/h$ |
| Coefficient A | 2 |

When each of the conditions of the example 1 was substituted into the above-mentioned expression (8) and calculated, Q1>786 $m^3/h$ was obtained. Then, the second seawater pump 50 was inverter controlled so that the treated water a4 was sure to have a pH suitable for release into sea and the flow rate of the dilution seawater a3 was 830 $m^3/h$. This calculation was performed by the controller 65 at intervals of 5 minutes and the flow rate Q1 of the dilution seawater a3 was controlled to be updated. As a result, the pH of the treated water a4 was always about 7 and suitable to be released into sea. In addition, the amount of dilution seawater a3 was less than twice the amount of cleaning seawater a1 and the amount of dilution seawater a3 was able to be reduced as compared with the above-described conventional art where the amount of dilution seawater is two to six times the amount of cleaning seawater, enabling energy saving in the present invention. Here, in the present example, even if the coefficient A is changed to be equal to or less than 2.23, it is possible to reduce the dilution seawater a3 as compared with twice the amount of cleaning seawater a1.

When each of the conditions of the example 2 was substituted into the above-mentioned expression (8a) and calculated, Q2>0.126 $m^3/h$ was obtained. Then, the pump 90 was inverter controlled so that the treated water a4 was sure to have a pH suitable for release into sea and the flow rate of the alkaline substance a5 was 0.14 $m^3/h$. This calculation was performed by the controller 65 at intervals of 5 minutes and the flow rate Q2 of the alkaline substance a5 was controlled to be updated. As a result, the pH of the treated water a4 was always about 7 and suitable to be released into sea. In addition, the amount of the alkaline substance a5 was able to be reduced to be relatively smaller than the amount of the cleaning seawater a1 or the amount of dilution seawater a3 in the example 1, thereby enabling downsizing the tank 80 and energy saving.

When each of the conditions of the example 3 was substituted into the above-mentioned expression (8a) and calculated, Q2>0.131 $m^3/h$ was obtained. Then, the pump 90 was inverter controlled so that the treated water a4 was sure to have a pH suitable for release into sea and the flow rate of the alkaline substance a5 was 0.15 m³/h, like in the example 2. As a result, the pH of the treated water a4 was always about 7 and suitable to be released into sea. In addition, the amount of the alkaline substance a5 was able to be reduced to be approximate to the amount in the example 2, thereby achieving the same effects.

When each of the conditions of the example 4 was substituted into the above-mentioned expression (8a) and calculated, Q2>0.197 m³/h was obtained. Then, the pump 90 was inverter controlled so that the treated water a4 was sure to have a pH suitable for release into sea and the flow rate of the alkaline substance a5 was 0.21 m³/h, like in the example 2. As a result, the pH of the treated water a4 was always about 7 and suitable to be released into sea. In addition, the amount of the alkaline substance a5 was able to be reduced to be approximate to the amount in the example 2, thereby achieving the same effects.

The present invention is not limited to the above-described embodiments and may be embodied in various modified forms. In the above-described embodiments, size and shape in the accompanying drawings are not intended for limiting the present invention, but may be modified appropriately as far as the effects of the present invention can be exerted. Other modifications and alterations are also possible without departing from the scope of the purpose of the present invention.

For example, the controller 65 controls driving of the second seawater pump 50 so that a ratio of the sum of the amount of $HCO_3$ ions of the cleaning seawater a1 and the amount of $HCO_3$ ions of the dilution seawater to the moles of $HSO_3^-$ ions obtained by being absorbed into the cleaning seawater a1 can meet $2 \leq A \leq 2.33$. However, this is not intended to limit the present invention. The controller 65 may control driving of the second seawater pump 50 so that the sum of amounts of $HCO_3$ ions become greater than the moles of $HSO_3^-$ ions as far as the treated water a4 can have quality suitable for release into sea.

What is claimed is:

1. An exhaust gas treatment device comprising:
    a scrubber configured to purify an exhaust gas into a purified gas by bringing $SO_2$ contained in the exhaust gas into contact with cleaning seawater to form $SO_2$-absorbed cleaning seawater, the scrubber further configured for discharging the $SO_2$-absorbed cleaning seawater as waste water;
    a first measurer configured to measure a flow rate of the exhaust gas before the exhaust gas is charged into the scrubber to determine a first measurement value;
    a second measurer configured to measure a concentration of the $SO_2$ of the exhaust gas before the exhaust gas is charged into the scrubber to determine a second measurement value;
    a third measurer configured to measure a concentration of $SO_2$ of the purified gas to determine a third measurement value; and
    a controller configured to calculate an amount of $HSO_3^-$ of the waste water based on the first, second and third measurement values of the first through third measurers to thereby obtain a calculation result, and configured to supply an amount of an alkaline substance, in accordance with the calculation result, to the waste water.

2. The exhaust gas treatment device according to claim 1, wherein the controller supplies the alkaline substance to the waste water so that a total sum of alkaline ions of the alkaline substance and alkaline ions of the cleaning seawater is greater than a number of moles of the $HSO_3^-$ of the waste water.

3. The exhaust gas treatment device according to claim 1, wherein the controller supplies the alkaline substance to the waste water so that a total sum of alkaline ions of the alkaline substance and alkaline ions of the cleaning seawater is equal to or more than twice a number of moles of the $HSO_3^-$ of the waste water and equal to or less than 2.33 times the number of moles of the $HSO_3^-$ of the waste water.

4. The exhaust gas treatment device according to claim 2, wherein the controller updates the total sum of the alkaline ions of the alkaline substance and the alkaline ions of the cleaning seawater in accordance with a navigation area.

5. The exhaust gas treatment device according to claim 2, further comprising:
    a fourth measurer configured to measure a flow rate of the cleaning seawater to be supplied to the scrubber to determine a fourth measurement value,
    wherein the controller calculates the amount of the alkaline substance to be supplied to the waste water, based on the fourth measurement value of the fourth measurer and the amount of $HSO_3^-$ of the waste water.

6. The exhaust gas treatment device according to claim 1, wherein the controller calculates an amount of $HSO_3^-$ of the waste water at given time intervals to determine another calculation result, and uses the another calculation result as a basis to update the amount of alkaline substance to be supplied to the waste water.

7. The exhaust gas treatment device according to claim 1, wherein the alkaline substance comprises seawater.

8. The exhaust gas treatment device according to claim 1, wherein the alkaline substance comprises at least one of NaOH water solution, $Mg(OH)_2$ slurry solution, $Ca(OH)_2$ slurry solution, and $CaCO_3$ slurry solution.

9. The exhaust gas treatment device according to claim 8, wherein the controller charges the waste water, to which the alkaline substance is supplied, into the scrubber to circulate the waste water to use as the cleaning seawater after the waste water has been supplied with the alkaline substance.

10. The exhaust gas treatment device according to claim 9, wherein the controller switches between charging the waste water, to which the alkaline substance is supplied, into the scrubber to be used as the cleaning seawater, and externally discharging the waste water.

11. The exhaust gas treatment device according to claim 1, wherein
    the controller calculates a desulfurization rate of the scrubber based on the second and third measurement values of the second and third measurers,
    the controller controls a flow rate of the cleaning seawater based on the desulfurization rate.

12. The exhaust gas treatment device according to claim 1, wherein the controller controls aeration treatment on the waste water by mixing air into the waste water.

13. A waste water treatment method for an exhaust gas treatment device, comprising:
    purifying an exhaust gas charged in a scrubber into a purified gas by bringing $SO_2$ contained in the exhaust gas into contact with cleaning seawater so that the cleaning seawater absorbs $SO_2$ from the exhaust gas;
    discharging the $SO_2$-absorbed cleaning seawater as waste water;
    measuring a flow rate and a concentration of $SO_2$ of the exhaust gas before the exhaust gas is charged into the scrubber, a concentration of $SO_2$ of the purified gas, and a flow rate of the cleaning seawater to be supplied to the scrubber;

calculating an amount of $HSO_3^-$ of the waste water based on measurement values used in said measuring to thereby obtain a calculation result; and supplying an amount of alkaline substance in accordance with the calculation result to the waste water.

14. An exhaust gas treatment device comprising:

a scrubber configured to purify an exhaust gas into a purified gas by bringing $SO_2$ contained in the exhaust gas into contact with cleaning seawater so that the cleaning seawater absorbs $SO_2$ from the exhaust gas, and for discharging the $SO_2$-absorbed cleaning seawater as waste water;

a first measurer configured to measure a flow rate of the exhaust gas before the exhaust gas is charged into the scrubber to determine a first measurement value;

a second measurer configured to measure a concentration of the $SO_2$ of the exhaust gas before the exhaust gas is charged into the scrubber to determine a second measurement value;

a third measurer configured to measure a concentration of $SO_2$ of the purified gas to determine a third measurement value; and a controller configured to calculate an amount of $HSO_3^-$ of the waste water based on the first, second and third measurement values of the first through third measurers to thereby obtain a calculation result, and configured to supply an amount of the cleaning seawater, in accordance with the calculation result, to the scrubber.

15. A waste water treatment method for an exhaust gas treatment device, comprising:

purifying an exhaust gas charged in a scrubber into a purified gas by bringing $SO_2$ contained in the exhaust gas into contact with cleaning seawater so that the cleaning seawater absorbs $SO_2$ from the exhaust gas;

discharging the $SO_2$-absorbed cleaning seawater as waste water;

measuring a flow rate and a concentration of $SO_2$ of the exhaust gas before the exhaust gas is charged into the scrubber, a concentration of $SO_2$ of the purified gas, and a flow rate of the cleaning seawater to be supplied to the scrubber;

calculating a desulfurization rate based on measurement values in said measuring to thereby obtain a first calculation result;

supplying a flow rate of cleaning seawater, in accordance with the first calculation result, to the scrubber;

calculating an amount of $HSO_3^-$ of the waste water based on measurement values in said measuring to thereby obtain a second calculation result; and supplying an amount of alkaline substance, in accordance with the second calculation result, to the waste water.

* * * * *